United States Patent [19]

Behle

[11] 4,397,444
[45] Aug. 9, 1983

[54] TANK CAR BOTTOM OUTLET VALVE HAVING COMBINATION RING AND VALVE SEAT

[75] Inventor: Gunter R. Behle, St. Peters, Mo.

[73] Assignee: ACF Industries, Incorporated, New York, N.Y.

[21] Appl. No.: 215,918

[22] Filed: Dec. 12, 1980

[51] Int. Cl.³ .......................... F16K 27/03; F16K 1/48
[52] U.S. Cl. ...................................... 251/144; 251/268
[58] Field of Search ......................... 251/144, 266, 268

[56] References Cited

U.S. PATENT DOCUMENTS

| | | | |
|---|---|---|---|
| 4,141,535 | 2/1979 | Reedy et al. | 251/144 |
| 4,198,032 | 4/1980 | Hillstead et al. | 251/144 |
| 4,234,158 | 11/1980 | Rollins et al. | 251/144 |

Primary Examiner—A. Michael Chambers
Attorney, Agent, or Firm—Henry W. Cummings

[57] ABSTRACT

In accordance with the present invention a tank car bottom outlet mounting flange is provided with a stepped valve seat slot to receive a contained valve seat member. The valve seat is provided with an upper internal valve seat portion to receive a valve closure. A valve seat body portion located below the valve seat portion is provided with a valve seat slot to receive an operator retainer to prevent the operator from moving vertically during operation. A valve seat flange portion extends radially outwardly from the valve seat body portion and is provided with first fastener openings for holding the valve seat member in place within the mounting flange and supporting the valve closure and any lading in the tank. The valve seat flange portion is provided with second fastener openings, preferably circumferentially spaced from the first fastener openings to receive fasteners to hold in place an outlet chamber extending below the valve seat member. Preferably an outlet chamber flange portion receives the second fasteners and also at least partially supports the operator retainer with the valve closure.

15 Claims, 7 Drawing Figures

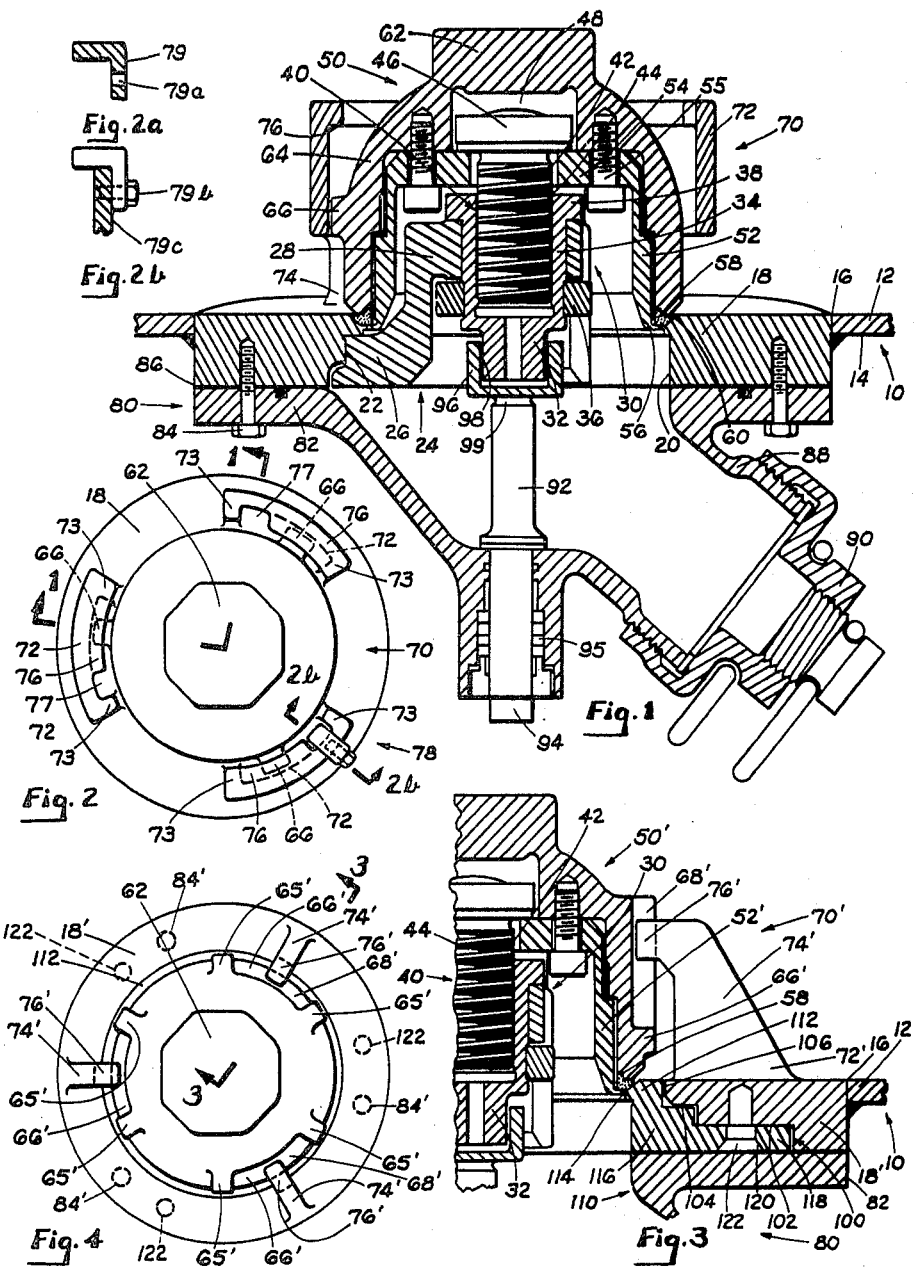

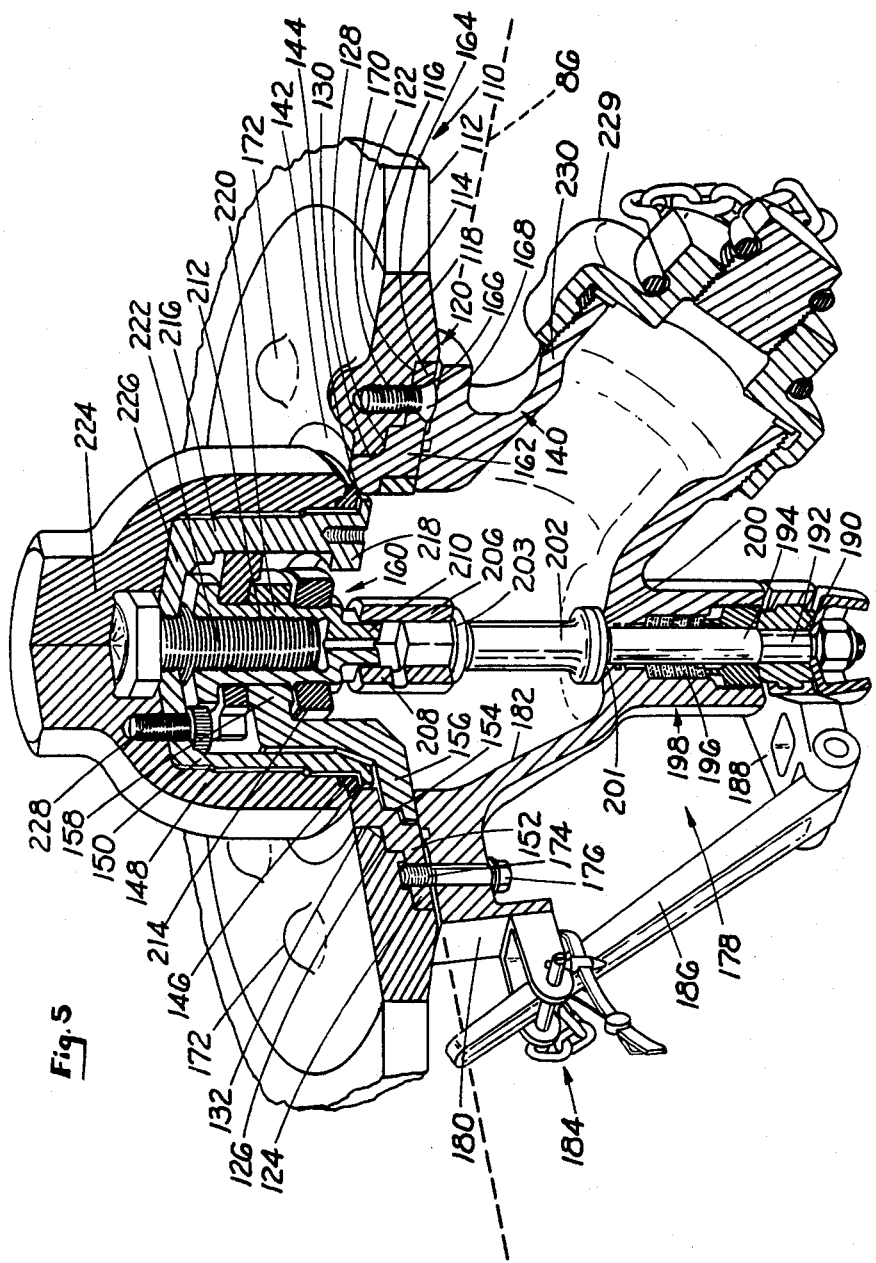

TANK CAR BOTTOM OUTLET VALVE HAVING COMBINATION RING AND VALVE SEAT

BACKGROUND OF THE INVENTION

In U.S. Pat. No. 3,981,481 granted Sept. 21, 1976 filed Oct. 8, 1974, a railway tank car bottom outlet valve assembly is disclosed in which the outlet chamber and a portion of a bottom operator for the valve closure drop off upon impact to the outlet chamber. In FIGS. 5-18 of this patent, movement of the valve closure between open and closed positions requires that a depending portion of the valve closure engage a retainer or spider to prevent rotation of the valve closure and allow the valve closure to move between open and closed positions.

While the construction shown in the patent represented a significant advance in the art in providing an outlet chamber which would shear off upon impact and prevent the lading from escaping during such an impact to the outlet chamber, the relatively thick mounting flange required in this construction necessary to mount both the valve seat and the spider or retainer to prevent rotation of the valve closure necessitated a mounting flange which extends more than one inch below the bottom surface of the tank bottom.

AAR and DOT regulations concerning projections extending below the tank bottom prohibit the mounting flange from extending more than one inch below the tank bottom without additional shear-off protection.

Another problem with the construction illustrated in the '481 patent is that the projections extending downwardly from the valve closure to prevent rotation of the valve closure also function to stop vertical movement of the valve closure in the full open position. In order to have satisfactory unloading rates, the amount of travel of the valve closure and the depending extensions must be of the order of 1½-2 inches. If these valve closure extensions were to be reduced in vertical extent sufficient to have a mounting flange extend no more than one inch below the tank bottom, the amount of available travel of the extensions would be less than one inch. This would result in too low lading unloading rates and loading rates for commercial acceptance.

It is unpleasant for the attendant and to some extent a safety hazard for the attendant to be located within the tank during installation. It therefore is desirable for the valve closure to be installed from the bottom of the tank.

In subsequent work developed by Assignee disclosed in U.S. Pat. No. 4,198,032 a bottom operable tank car valve assembly is disclosed which can be installed from the bottom of the tank without an attendant located within the tank. In this assembly a retaining ring is provided which supports and holds in place a valve seat for a lading valve closure.

During assembly the valve closure is placed upon the valve seat. A key is wedge into a slot in the valve seat. This assembly is lifted up into the tank until a valve seat shoulder abuts a shoulder of a slot in a tank mounting flange. The valve seat is rotated until the key aligns with a slot in the tank mounting flange. When the operator is thus supporting the valve seat and valve closure, a retaining ring is lifted until it abuts a ledge on the valve seat and another shoulder on the valve seat to support the valve seat. The retainer is then rotated until fastener openings in the ring align with fastener openings in the mounting flange and a fastener is started into the threads in the mounting flange.

This is a difficult and awkward operation for an attendant situated below a railway tank car. The key is sometimes lost. Even if the key is not lost, aligning the ring with fastener openings in the mounting flange is difficult and is particularly unpleasant in inclement weather.

Thus, this subsequent development of the retainer with the key and key slot has not been found to be entirely satisfactory.

SUMMARY OF THE INVENTION

The object of the present invention is to provide a tank car bottom operable valve assembly in which the tank mounting flange does not extend below the lower external surface of the tank bottom in excess of one inch.

Another object of the present invention is to provide a tank car bottom outlet valve assembly which can be installed from the bottom without an attendant having to be inside the tank during installation or removal.

Another object of the invention is to eliminate the need to align the valve seat key with a slot in the mounting flange while aligning the fastening openings in the ring with fastener openings in the mounting flange.

In accordance with the present invention a tank car bottom outlet mounting flange is provided with a stepped valve seat slot to receive a contained valve seat member. The valve seat is provided with an upper internal valve seat portion to receive a valve closure. A valve seat body portion located below the valve seat portion is provided with a valve seat slot to receive an operator retainer to prevent the operator from moving vertically during operation. At least one valve seat flange portion extends radially outwardly from the valve seat body portion and is provided with first fastener openings for holding the valve seat member in place within the mounting flange and supporting the valve closure and any lading in the tank. The valve seat flange portion is provided with second fastener openings, preferably circumferentially spaced from the first fastener openings to received fasteners to hold in place an outlet chamber extending below the valve seat member. Preferably an outlet chamber flange portion receives the second fasteners and also at least partially supports the operator retainer within the valve closure.

IN THE DRAWINGS

FIG. 1 is a vertical sectional view of a previously unpublished valve closure assembly looking in the direction of the arrows along the line 1—1 in FIG. 2.

FIG. 2 is a plan view of FIG. 1.

FIG. 3 is a vertical sectional view of one embodiment of the present invention.

FIG. 4 is a plan view of the embodiment shown in FIG. 3.

FIG. 4a is a sectional view looking in the direction of the arrows along the line 4a—4a in FIG. 4.

FIG. 5 is a schematic perspective view of the tank car bottom outlet valve seat arrangement of the present invention.

DETAILED DESCRIPTION OF PREVIOUS UNPUBLISHED CONSTRUCTION

In one prior proposed unpublished construction, tank car 10 includes a tank bottom 12 having a lower external surface 14. An opening 16 is provided in the tank bottom and a mounting flange 18 which does not extend below the lower external surface of the tank bottom in excess of one (1) inch, is welded into the opening 16.

The mounting flange 18 includes an opening 20 for lading to exit through. The opening is provided with a stepped contour 22 at selected locations about the periphery of the opening 20 and which receives a retainer guide indicated generally at 24 including a lower portion 26 and an upper portion 28 which engages an operator indicated generally at 30. For example this may be provided by three (3) retainer webs 26.

Operator 30 includes a lower connection portion 32 and a threaded internal surface 34. Retainer portion 28 is held in place with a collar 36 and an outwardly extending portion 38 of the operator 30. The internal threads 34 of operator 30 engage a depending closure operator indicated generally at 40 including external threads 42 located on a shank portion 44, and a top portion 46 located in an opening 48 in a valve closure member 50. Top portion 46 is held in place with a valve closure depending member 52 having an upper horizontal portion 54 which receives fasteners 55 extending into the closure 50, and a lower portion 56 which holds in place a seal 58 which engages a tapered valve seat 60 located on the mounting flange 18. Valve closure 50 includes a dome portion 62 of square or hexagon configuration and a body portion 64 having a plurality of outwardly extending stops 66.

One or more members indicated generally at 70 are located within the tank 10. Stop members 70 include a body portion 72 which is supported by a base portion 74 which is integral with the mounting flange 18. Body portion 72 is provided with a plurality of stop lugs 76 at locations above the lugs 66 on the valve closure. Openings 77 are provided in lugs 76 to allow the closure to be inserted into the stop(s) from above and rotated until the lugs 66 are below step lugs 76. Closure means 78 such as an end closure 79, and "L" shaped member having an openings 79a, held in place with a fastener 79b threaded into an opening 79c in body portion 72, are also provided to prevent escape of the closure in the full open position.

An outlet chamber indicated generally at 80 including a flange portion 82 is held in place with fasteners 84 which extend into the mounting flange 18. The juncture of the flange portion 82 with the mounting flange 18 defines a shear plane indicated at 86. The mounting flange contains the conventional unloading spout 88 having a suitable cap therefore 90. The outlet chamber further includes an operating shaft 92 having a lower connection portion 94 extending up through the outlet seal 95 and having an upper non-round engagement portion indicated at 96 adopted to rotate the non-round portion 32 of the operator 30.

It will thus be apparent that when a suitable tool is applied to the non-round portion 94, the non-round portion 94, the shaft 92 will rotate. This in turn rotates the non-round portions 32 and the operator 30. Retainer guide 24 prevents vertical movement of the operator 30. However, rotation of the operator 30 causes rotation of the depending member 40 by virtue of the threaded engagement 34 and 42. Rotation of the closure occurs and in closed position wiping of the valve seat occurs until closure lugs 66 engage end closures 73 of the stops. Further rotation of the closure 40 is prevented by virtue of engagement of the closure lugs 66 with the stop closures 73. Further rotation of the operator 30 causes vertical movement of the valve closure 50 from the seated position shown in FIG. 1 to an open position wherein the lugs 66 of the valve closure engage the stop 76 of the stop member 70. A full two (2) inches of movement is provided by locating the stop member 70 within the tank. At the same time, the mounting flange 18 need not extend in excess of one (1) inch below the tank bottom 14. Rotation of the shaft 92 by the connection portion 94 in the opposite direction of the internal rotation of the closures until engagement of the lugs 66 with end closures 73 will return the valve closure to the seated position again with rotation of the valve closure prevented by engagement of the closure lugs 66 with end closures 73.

In the event of impact to the outlet chamber 80, the outlet chamber will shear along the shear plane 86 and the operator 92 will drop off by virtue of the clearance 98 between non-round portion 96 and non-round portion 32 and/or because of a suitable groove 99 provided in the operating shaft which aligns with the shear plane 86.

The disadvantage of the embodiment illustrated in FIGS. 1 and 2 is that the valve closure 50 including the depending member 52 holding in place the seal 58 and the depending operator 40 must be installed from inside the tank by lowering the closure into the stop assembly 70 and threading the operator 40 into the operator 30 installed from the bottom. This requires two attendants, one inside the car and one outside the car, and is a difficult and awkward operation.

DESCRIPTION OF THE PRESENT INVENTION

In accordance with the present invention, illustrated in FIGS. 3 and 4, the valve closure 50' is provided with outwardly extending stops or lugs 66' which are located nearer the tank bottom than the stops 66. Stops 66' are located with a slot 68' formed in the closure between end closures 65'. A stop member 70' includes a base portion 72' welded or cast to mounting flange 18' and including a body portion 74' extending upwardly from flange 18' and inwardly extending stop members 76' located above closure lugs 66'. Operation of the steps to allow limited wiping rotation and then vertical movement without rotation is as disclosed with regard to FIGS. 1 and 2.

However in accordance with this embodiment, mounting flange 18' is provided with a step slot or contour indicated generally at 100 including a first shoulder portion 102, a second shoulder portion 104 located inwardly and above shoulder 102, and a vertical valve seat slot portion 106. At least one removable valve seat member 110 is inserted within the slot 100. The valve seat member 110 includes a valve seat portion 112 having a tapered surface 114 to receive the seal 58. The valve seat member 110 further includes a body portion 116 located below the valve seat portion which is adopted during installation to abut the shoulder 104. Valve seat member 110 further includes a flange portion 118 which abuts the shoulder 102 and is provided with countersunk openings 102 adopted to receive countersunk fasteners 122 which extend into the mounting flange 18' to mount the valve seat member within the slot 100.

Additionally circumferential spaced from the fasteners 122, fasteners 84' are located which extend only into the mounting flange 110 on which mounts an outlet chamber 80 constructed in the same manner as outlet chamber 80 in FIGS. 1 and 2.

However the advantage of the embodiment shown in FIGS. 3 and 4 is that the mounting flange 110, the valve closure 50, depending member 52', seal 58, retainer 26, and operator 30 may all be assembled on the bench. Then this entire assembly is inserted into the tank 10 from the bottom. Thus it is not necessary for an attendant to enter the tank and the installation and removal operation is much easier than the embodiment shown in FIGS. 1 and 2.

In another embodiment shown in FIG. 5, railway tank car 110 includes a tank bottom 112. The tank bottom 112 is provided with an opening 114 which receives a mounting flange 116. The mounting flange 116 is tapered at 118 at a ratio of three (3) longitudinal units to one (1) vertical unit in accordance with AAR regulations and includes a mounting flange slot indicated generally at 120. The mounting flange slot 120 includes an outer flange portion 122 which defines a shoulder 124. A mounting flange body portion 126 of greater vertical extent than the flange portion 122 which also defines a shoulder 128. Finally, the slot includes a valve seat slot portion 130 including a vertical surface 132.

A valve seat member 140 includes a valve seat portion 142 located within the mounting flange slot portion 130. Valve seat portion 142 includes a tapered surface 144 to receive a valve seal 146 held in place upon a valve closure member 148 by a depending valve closure member 150. Valve seat member 140 further includes a body portion 152 located generally below the valve seat portion 142. The valve body portion 152 includes a slot 154 to receive an operator retainer 156 which extends inwardly and upwardly and engages at 158 an operator indicated generally at 160. The operation of operator 160 is disclosed in U.S. Pat. Nos. 4,198,032, 4,124,193 and 4,141,553. Reference may be made to these patents for a description of this operation. Valve body portion 152 further includes a formed shoulder 162 which abuts the shoulder 128 on the mounting flange 116. Thus the vertical extent of the valve seat body portion is of less extent than the valve seat portion 142.

The valve seat member is further provided with a valve seat flange portion 164 extending radially outwardly from the valve body portion 152. Valve seat portion 164 is of less vertical extent than valve body portion 152 and fits within the flange slot portion 122 of the mounting flange 116. Valve seat flange portion 164 includes a plurality of fastener openings 166 adopted to receive fasteners 168 which are countersunk and which are threaded into openings 170 in the mounting flange 116. At these positions the mounting flange 116 is conveniently provided with knobs 172 providing added material above the threaded fasteners 168. For example, eight (8) such fasteners may be provided about the periphery of the mounting flange 116. These fasteners 168 and the valve seat member 140 carry the weight and load of the valve closure member 148 and any lading L which may be within the tank.

The flange portion 164 is also provided with second openings 174 which are circumferentially spaced from the opening 166 and which receive fasteners 176 which hold in place an outlet chamber 178 having a flange portion 180 through which the fasteners 176 pass. The flange portion 180 includes an inner end portion 182 which at least partially supports the retainer 156. Flange portion 180 has mounted thereon an operating handle 184 for the operating assembly 160.

The operation of handle 184 is described in detail in U.S. Pat. No. 4,212,447 granted July 15, 1980 and reference may be made to that patent for a description of the operating handle and its use in rotating the operator assembly 160 U.S. Pat. No. 4,212,447. Briefly, the handle assembly 184 includes a handle 186 which may be rotated into a generally horizontal position and which is adopted to rotate a shaft engagement member 188 having a non-round opening 190 which engages a non-round shaft portion 192. Non-round shaft portion 192 is integral with an upwardly extending shaft 194 which extends through a packing 196 in an outlet chamber shaft portion 198. Shaft 194 is provided with a shoulder 200 which rests upon the upper surface 201 of outlet chamber portion 198. Shaft 194 further includes an upwardly extending portion 202 having a supporting surface 203 and has at its upper end a non-round end 204 which within a non-round connector 206 is supported by the surface 203. Non-round connector 206 includes an upper non-round portion 208 which engages a depending non-round portion 210 of an upper operating member 212. Upper operating member 212 is engaged by the inner portion 158 of retainer 156 to prevent vertical movement of the operating member 212. A collar 214 is provided to further support the inner end 158 of retainer 156. Closure depending members 150 include a portion of increased cross section 216 which includes inwardly extending projections 218 adopted to engage when the closure is in open position a stop member 220 located above retainer portion 158.

Upper operator 212 is internally threaded and receives an externally threaded member 222 which is held within an opening 224 in closure 148 by means of horizontal portion 226 of depending member 150 and fasteners 228 extending into closure 148.

As is described in greater detail in the aforementioned U.S. Pat. Nos. 4,124,193 and 4,141,134 and 4,212,447, rotation of the handle 186 in the horizontal position is effective to rotate shaft member 194 and rotate upper operator 212 which does not move vertically because of retainer 156 and inner ends 158. However, rotation of upper operator 212 rotates depending member 222 which moves vertically and which moves closure member 148 between open and closed position. Portions 216 of depending members 150 engage retainer members 156 to prevent rotation of the closure 148 as the closure moves vertically between open and closed positions. Obviously during loading or unloading of the lading, the cap 229 is removed from the spout portion 230 of the outlet chamber 178.

However, to assemble the valve seat member 140 and the valve closure member 148, the valve closure member 148 with the seal 146 and retainers 156 in place, is moved upwardly with the valve closure and internal workings thereof extending into the tank until the valve seat 140 abuts the contoured slot 120 in the mounting flange 116. The valve seat member is then rotated until the openings 166 align with the openings 170 in the mounting flange. The fasteners 168 are then threaded into place. It is not necessary to align a key in the valve seat with a slot in the mounting flange or at the same time, lift into place and rotate a retainer member which must be aligned with fastener openings in the mounting flange. Thus it is a much simpler and easier operation for the operator to install the valve seat and valve closure assembly of the present invention. Thus a much improved valve seat and valve closure assembly is achieved with the design of the present invention over the subsequent separate retainer construction shown in U.S. Pat. No. 4,198,032.

What is claimed is:

1. A tank car bottom outlet valve assembly comprising: a tank bottom having a tank bottom lower external surface; a mounting flange located within a bottom opening in said tank bottom; said mounting flange including a lower flange surface and an upper flange surface; said lower flange surface located below said tank bottom surface a distance not in excess of one (1) inch; said mounting flange including a valve seat slot; said valve seat slot including a slot first portion extending upwardly from said lower flange surface toward said upper flange surface; said slot first portion extending radially inwardly to a flange internal vertical surface at a level above said lower flange surface and below said upper flange surface; said slot including a second slot portion extending vertically along said flange internal vertical surface to said upper flange surface; said slot adapted to receive a removable valve seat member; said valve seat member including an internal valve seat portion located within said second slot portion and adapted to receive a valve closure movable between open and closed positions; a valve seat body portion located below said valve seat portion and supporting said valve seat portion; at least one valve seat flange portion extending radially outwardly from said valve seat body portion and being located within said slot first portion and including fastening means for holding the valve seat member in place within said mounting flange and for supporting said valve closure and any lading in the tank; said valve seat member and said valve closure being removable from the bottom by removing said fastening means without the attendant having to enter the tank.

2. A tank car bottom outlet valve assembly according to claim 1, wherein said valve seat flange portion comprises one piece.

3. A tank car bottom outlet valve assembly according to claim 2, wherein said mounting flange slot includes a third slot portion above said slot first portion and below said slot second portion and extending radially outwardly from said slot second portion, and wherein at least a portion of said valve seat body portion is located within said slot third portion.

4. A tank car bottom outlet valve assembly comprising: tank bottom having a tank bottom opening therein and a lower external surface; a tank mounting flange located within said bottom opening; said mounting flange including a lower flange surface and an upper flange surface; said lower flange surface extending below said tank lower external surface an amount not more than one (1) inch; said mounting flange including a mounting flange slot; said mounting flange slot including a first slot portion extending upwardly from said flange lower surface to a level intermediate said lower surface and said upper surface; said slot first portion extending radially inwardly to the internal surface of the flange at a level below said upper surface; and a second portion extending vertically along said internal surface to said upper surface; said slot adapted to receive a removable valve seat member; said valve seat member including an internal valve seat portion adapted to receive a valve closure movable between open and closed positions; said valve seat member having a valve seat opening therein; said valve seat portion located within said second slot portion; a valve seat body portion located below said valve seat portion and supporting said valve seat portion; at least one valve seat flange portion extending radially outwardly from said valve seat body portion and extending into said slot first portion and including fastening means for holding the valve seat member in place within said mounting flange slot and for supporting said valve closure and any lading in the tank; rotating means for rotating said valve closure located within said valve seat opening; said valve closure having stop means which engage fixed stop means located within said assembly whereby when said valve closure is rotated by said rotating means and said closure stop means engage said fixed stop means said closure moves vertically without rotation and whereby said valve seat and said valve closure are removable from the bottom of the tank by removal of said fastening means without the attendant having to enter the tank.

5. A tank car bottom outlet valve assembly according to claim 4, wherein said valve seat flange portion comprises one piece.

6. A tank car bottom operable valve assembly according to claim 5, wherein said fixed stop means comprise inwardly extending projections located within said valve seat opening which engage valve closure stop means located within said closure to prevent rotation.

7. A tank car bottom outlet valve assembly comprising: a tank bottom having a tank bottom opening therein and a tank lower external surface; a tank mounting flange located within said mounting bottom opening; said flange including a lower flange surface and an upper flange surface; said lower flange surface extending below said tank lower external surface an amount not more than one (1) inch; said mounting flange including a mounting flange slot including a first slot portion extending upwardly from said flange lower surface to a level intermediate said lower surface and said upper surface; said slot first portion extending radially inwardly to the internal surface of the flange at a level below said upper surface; and a second portion extending vertically along said internal surface to said upper surface; said slot adapted to receive a removable valve seat member; said valve seat member including an internal valve seat portion adapted to receive a valve closure movable between open and closed positions; said valve seat member having a valve seat opening therein; said valve seat portion located within said second slot portion; a valve seat body portion located below said valve seat portion and supporting said valve seat portion; at least one valve seat flange portion extending radially outwardly from said valve seat body portion and extending within said slot first portion and including first fastening means for holding the valve seat member in place within said mounting flange and for supporting said valve closure and any lading in the tank; an outlet chamber located below said mounting flange; second fastening means, holding said outlet chamber in engagement with said mounting flange; a lower operator extending at least partially through said outlet chamber and engaging an internal operator located within said valve closure and within said valve seat opening; means for maintaining said internal operator spaced from said valve seat and vertically fixed but rotatable; means depending from said valve closure and engaging said internal operator whereby rotation of said lower operator will cause said internal operator to rotate but remain vertically fixed and caused said valve closure to move vertically between open and closed positions relative to seat without rotation during vertical movement; and whereby said outlet chamber is removable from the bottom by removing said second fasteners, and after removal of said outlet chamber, said valve seat and said valve closure are removable from the mounting flange from the bottom of the tank, by removing said first fasteners, without the attendant having to enter the tank.

8. A tank car bottom outlet valve assembly according to claim 7, wherein said valve flange seat portion comprises one piece.

9. A tank car bottom outlet valve assembly according to claim 8, wherein a shear plane is defined between said outlet chamber and said mounting flange; and whereby if said outlet chamber is impacted said outlet chamber and said lower operation will shear off along said shear plane.

10. A tank car bottom operable valve assembly according to claim 8, wherein said second fastener openings are circumferentially spaced from said first fastener openings.

11. A tank car bottom operable valve assembly according to claim 10, wherein said outlet chamber includes an outlet flange portion which receives said second fasteners.

12. A tank car bottom operable valve assembly according to claim 11, wherein said valve seat portion includes a valve seat slot to receive an operator retainer to prevent an operator for the valve closure from moving vertically when said operator is rotated.

13. A tank car bottom operable valve assembly according to claim 12, wherein said outlet flange portion also at least partially supports the operator retainer with the valve closure.

14. A tank valve assembly according to claim 8, wherein open position stop means are provided within said tank which said closure engages in full open position.

15. A tank valve assembly according to claim 14, wherein said valve seat body portion is provided with a valve seat slot to receive a closure operator retainer to prevent a closure operator from moving vertically during operation.

* * * * *